United States Patent
Ge et al.

(10) Patent No.: US 12,016,359 B2
(45) Date of Patent: Jun. 25, 2024

(54) OIL-IN-WATER EMULSION GUMMY COMPOSITION WITH WATER SOLUBLE ACTIVE INGREDIENT(S)

(71) Applicant: PHARMAVITE LLC, West Hills, CA (US)

(72) Inventors: Haiyan Ge, Valencia, CA (US); Yan Wu, Shanghai (CN); Javier Pacheco, Sylmar, CA (US)

(73) Assignee: PHARMAVITE LLC, West Hills, CA (US)

( * ) Notice: Subject to any disclaimer, the term of this patent is extended or adjusted under 35 U.S.C. 154(b) by 0 days.

(21) Appl. No.: 17/985,752

(22) Filed: Nov. 11, 2022

(65) Prior Publication Data

US 2024/0156142 A1    May 16, 2024

(51) Int. Cl.
| | |
|---|---|
| A23L 33/15 | (2016.01) |
| A23G 3/50 | (2006.01) |
| A23L 27/10 | (2016.01) |
| A23L 27/12 | (2016.01) |
| A23L 27/20 | (2016.01) |
| A23L 29/281 | (2016.01) |

(52) U.S. Cl.
CPC .............. *A23L 29/284* (2016.08); *A23G 3/50* (2013.01); *A23L 27/10* (2016.08); *A23L 27/13* (2016.08); *A23L 27/202* (2016.08); *A23L 33/15* (2016.08)

(58) Field of Classification Search
CPC ........ A23L 29/284; A23L 33/15; A23L 27/10; A23L 27/13; A23L 27/202; A23G 3/50
USPC .......................................................... 426/89
See application file for complete search history.

(56) References Cited

U.S. PATENT DOCUMENTS

| | | |
|---|---|---|
| 5,626,896 A | 5/1997 | Moore et al. |
| 6,528,102 B1 | 3/2003 | Coyle et al. |
| 6,759,079 B2 | 7/2004 | Klug et al. |
| 6,835,407 B2 | 12/2004 | Hotta et al. |
| 7,470,119 B2 | 12/2008 | Cotten et al. |
| 7,678,397 B2 | 3/2010 | Macquarrie |
| 8,241,672 B2 | 8/2012 | Driscoll |
| 9,119,405 B2 | 9/2015 | Smit-Kingma et al. |
| 9,539,205 B2 | 1/2017 | Haug et al. |
| 9,642,826 B2 | 5/2017 | Driscoll |
| 9,655,873 B2 | 5/2017 | Driscoll |
| 9,724,296 B2 | 8/2017 | Seternes et al. |
| 9,782,374 B2 | 10/2017 | Hu et al. |
| 2003/0077362 A1 | 4/2003 | Panhorst et al. |
| 2005/0260329 A1 | 11/2005 | Yusuf et al. |
| 2007/0148285 A1 | 6/2007 | Yang |
| 2010/0226904 A1 | 9/2010 | Davis |
| 2011/0256271 A1 | 10/2011 | Bhattacharya et al. |
| 2012/0035277 A1 | 2/2012 | Davis |
| 2012/0251667 A1 | 10/2012 | Dwivedi |
| 2013/0287899 A1 | 10/2013 | Rifkin |
| 2017/0127712 A1 * | 5/2017 | Yiannios ................. A23L 33/10 |
| 2018/0020692 A1 | 1/2018 | Dwivedi |
| 2018/0250225 A1 | 9/2018 | Appleton et al. |
| 2019/0133893 A1 | 5/2019 | Recio Saucedo |
| 2019/0289872 A1 | 9/2019 | Syed |
| 2020/0037653 A1 * | 2/2020 | Ge .......................... A23L 33/15 |

FOREIGN PATENT DOCUMENTS

| | | |
|---|---|---|
| WO | 2006049947 A2 | 5/2006 |
| WO | 2009141074 A1 | 11/2009 |
| WO | 2012017054 A1 | 2/2012 |
| WO | 2016164470 A1 | 10/2016 |
| WO | 2018152334 A1 | 8/2018 |
| WO | 2018206695 A1 | 11/2018 |

* cited by examiner

*Primary Examiner* — Brent T O'Hern

(74) *Attorney, Agent, or Firm* — William Thomas Babbitt; LEECH TISHMAN FUSCALDO & LAMPL

(57) ABSTRACT

A gummy composition including a set emulsification of an oil phase and a water phase, and a water-soluble active ingredient. A method including administering a gummy composition including a set emulsification of an oil phase and a water phase, and a water-soluble active ingredient.

18 Claims, No Drawings

OIL-IN-WATER EMULSION GUMMY COMPOSITION WITH WATER SOLUBLE ACTIVE INGREDIENT(S)

FIELD

Nutritional compositions particularly gummy compositions and methods related thereto.

BACKGROUND

Chewable gummy (gum) products or compositions generally made of gelatin or pectin matrix with sugar, glucose, corn syrup, flavoring, coloring and citric acid have been a popular snack food product. The product (composition) typically has a gel or gel-like structure and texture with a length on the order of two centimeters (cm) and is produced in a variety of shapes, colors and flavors that are chewable when consumed. Recently, gummy products have been supplemented with vitamins, minerals, essential oils and other nutritional supplements to provide a nutritional supplement that appeals to children and adults that do not like to swallow or have difficulty swallowing tablets or capsules.

Gummy compositions are often formed as a water-based gummy slurry of a gelatin and sugar mixture. The gummy slurry is mixed at an elevated temperature (e.g., 70° C. to 100° C.) to produce a flowable liquid. The flowable liquid is poured into a mold and allowed to set. A conventional mold is a corn starch mold. A corn starch mold is formed by stamping a desired gummy shape on a tray filled with corn starch powder. Once in the mold, the gummy composition is cooled and allowed to set. After the gummy composition has set, i.e., completely solidified, the tray is tipped over, breaking the mold and separating the gelled gummy composition from the corn starch. The starch mold generally functions to reduce a temperature of the gummy composition and to absorb water from the gummy. Both help with the gummy solidification. Usually it takes about 24 hours for the gummy composition to completely set with a "set time" defined as the time it takes for a gummy composition to form a firm gelled structure throughout—from an outer surface to a midpoint when measured on each side or face. Once the gummy composition has set, the gummy composition may be destarched and coated (for example with carnauba wax).

Starchless production of gummy compositions offers advantages such as good hygiene and generally fast setting (gelation) over conventional production. An example of a starchless mold is a silicone mold.

DETAILED DESCRIPTION

A chewable gummy or gum composition for oral consumption comprising, consisting essentially of or consisting of a water-soluble active ingredient (at least one) in a set emulsification of an oil phase in a water phase is disclosed. A "water-soluble active ingredient" means a vitamin, mineral, nutrient, herb, plant, extract or other component that provides a biologically active or other direct effect in the diagnosis, cure, mitigation, treatment or prevention of disease or to affect the structure of any function of the body of humans or animals and that is water-soluble. Examples of a water-soluble vitamin include without limitation vitamin C and the B vitamins (folate, thiamine, riboflavin, niacin, pantothenic acid, biotin, vitamin B6 and vitamin B12). An example of a water-soluble nutrient includes, but is not limited to, choline. An example of an extract includes, but is not limited to, mango leaf extract. Examples of herbs include, but are not limited to, herbal extracts of chamomile and ashwagandha.

In addition to a water-soluble active ingredient or ingredients, the gummy or gum composition may include constituents comprising, consisting essentially of or consisting of a structurant or structurants, sugar (sucrose), a sweetener (e.g., a sugar alcohol such as maltitol and/or xylitol, corn syrup, fructose), masking agent(s) and/or flavor(s), buffer(s) or pH adjuster(s), water and oil or oils in combination. The constituents of a structurant or structurants, sugar (sucrose), a sweetener or sweeteners and water may make up a water phase of a gummy or gum composition, with these constituents combined together prior to combination with an oil or oils defining an oil phase.

The gummy or gum composition is an oil-in-water emulsion. The water phase may be described as the continuous phase, that contains the constitutents of a structurant or structurants (e.g., gelatin, pectin, agar-agar, locust bean gum), water, sugar, sweetener, masking agent(s) and/or flavor(s), and buffer(s) or pH adjuster(s). The oil phase contains medium chain triglyceride (MCT) oil and optionally lecithin (e.g., rapeseed lecithin). Lecithin has a property to improve a flow of a mixture of the active ingredients and constituents of a gummy or gum composition during preparation. For example, for a water-soluble active ingredient such as vitamin C at high amounts (e.g., greater than 10 percent by weight of the gummy or gum composition), it is believed that including lecithin allows the lecithin to act as a lubricant to assist Vitamin C particles to suspend into the oil phase during a process of forming a gummy or gum compositon. In the formation of a gummy or gum composition, the water phase and oil phase are combined as an emulsion. Prior to the combination, the water phase may be heated to an elevated temperature (e.g., 80° C. to 100° C.) for a period of time to, for example, dissolve the sugar constituent. To allow greater amounts of active ingredient as well as possibly avoid degradation of the active ingredient or active ingredients in the formation of a gummy or gum composition, the active ingredient or active ingredients may be contained in the oil phase. Without wishing to be bound theory, when the energy (high shear) during the emulsion (homogenization) process allows the active ingredient or active ingredients to move to the water phase and dissolve therein.

The amount of each particular consistuent may be selected to yield a gummy or gum composition having particular structural or physical properties as well as taste properties. In terms of measurable physical properties, a gummy or gum composition has a hardness of 115 gForce or greater, such as 115 gForce to 500 gForce, and such as 130 gForce to 500 gForce, measured as a peak force using a TA-8A probe to push through a gummy or gum composition sample from a top surface for 5 millimeters (mm) at a speed of 0.5 millimeters per second (mm/sec.), the gummy or gum composition sample having a square shape of 2.0 centimeters (cm) by 2.0 cm with thickness of 0.9 cm. Brix is measured using a Brix Refractometer. A gummy or gum composition has a water activity of 0.73 or less such as 0.70 or less, measured using an Aqualab 4TE water activity meter from the Meter Group, and a ° Brix of 76 to 83, such as 78 to 81 measured using a hand-held refractometer from Atago Co., Ltd. A target pH of a gummy or gum composition may be a pH of 2.9 to 4.5, such as a pH of 3.2 and 4, such as a pH of 3.4 to 3.8.

The structurant may be, for example, gelatin, pectin, agar (or agar-agar), locust bean gum or a combination of one or more structurants (e.g., two different structurants (gelatin and pectin; gelatin and agar-agar; etc.). A structurant of gelatin may be a gelatin having a bloom of 150, such as a bloom of 250 to a bloom of 300 (e.g., 250 Bloom gelatin, 275 Bloom gelatin). A structurant of pectin may be in the form a methacrylate, an amide or a methacrylate and amide combination. The pectin may be high methoxyl (HM) pectin or low methoxyl (LM) pectin. When a structurant of gelatin is used (e.g., 250 Bloom gelatin), the gummy or gum composition may include at least one other structurant such as pectin or agar-agar. When a structurant of gelatin is combined with a second structurant, the structurant of gelatin may be present in amount of 1.7 times to 3.3 times the second structurant with the other structurant (agar-agar or pectin) being present in an amount of at least 1.3 weight percent. When a structurant is pectin or agar-agar, the gummy or gum composition may be limited to a single structurant or may be combined with other structurants. The amount of structurant(s) in a composition may be on the order of 2 percent by weight of the final composition to 7 percent by weight, such as 2.5 percent by weight to 6.5 percent by weight, such as 5 percent by weight to 6.5 percent by weight, such as 5.5 to 6 percent by weight. Pectin, when used alone, may be present in a gummy or gum composition in an amount on the order of 2 percent by weight to 3 percent by weight. When pectin is used in combination with another structurant, such as a gelatin (e.g, 250 Bloom gelatin), an amount of pectin present in a gummy or gum composition may be on the order of 2.5 percent by weight or less, such as 1 percent by weight to 2 percent by weight. Representative combinations of structurants include 250 Bloom gelatin at 3 percent by weight to 4 percent by weight with agar-agar at 1.3 percent by weight to 2 percent by weight with a total amount of structurant no less than 4.5 weight percent; and 250 Bloom gelatin at 3 percent by weight to 5 percent by weight and pectin at 1.2 percent by weight to 2.2 percent by weight with a total amount of structurant no less than 6 weight percent. A representative ratio of gelatin to a second structurant or structurants is 1.7 to 3.3.

An amount of water in a gummy or gum composition may be 8 percent by weight to 25 percent by weight, such as 9 percent by weight to 23 percent by weight, and such as 10 percent by weight to 22 percent by weight.

An amount of sugar (sucrose) in a gummy or gum composition may be 10 percent by weight to 30 percent by weight, such as 12 percent by weight to 28 percent by weight, such as 14 percent by weight to 26 percent by weight and such as 15 percent by weight to 27 percent by weight.

An amount of sweetener or sweeteners, exclusive of sugar (sucrose), in a gummy or gum composition may be on the order of 5 percent by weight to 50 percent by weight. The amount selected may depend at least in part on the sweetener or sweeteners selected. Representative sweeteners include, but are not limited to, a sugar alcohol (e.g., a disaccharide polyol such as maltitol, xylitol) and a reducing sugar such as fructose or corn syrup. The sweeteners may be used alone or in combinations (e.g., combinations of maltitol and corn syrup, combinations of maltitol and xylitol, combinations of two or more corn syrups having different viscosities).

An oil phase of a gummy or gum composition includes medium chain triglyceride (MCT) oils such as coconut or palm kernel oil. An amount of MCT oil or oils in a gummy or gum composition is on the order of 5 percent by weight to 12 percent by weight, such as 5 percent by weight to 10 percent by weight, such as 6 percent by weight to 10 percent by weight. An amount of MCT oil will depend in part on the active ingredient(s) and the amount of active ingredient(s) present in a gummy or gum composition. Without wishing to be bound by theory, it is believed that the structurant(s) need to interact with the MCT oil to stabilize the composition as a cohesive unit. Certain active ingredients like ascorbic acid/sodium ascorbate and choline have a tendency themselves to interact with the structurant or structurants in the gummy or gum composition which interaction may interfere with the interaction between the structurant(s) and the MCT oil and limit an amount of MCT oil that can be present in a suitable gummy composition. Other active ingredients such as herbs, herb extracts and plant extracts do not tend to interact with structurants). For gummy or gum compositions including these non-structurant-interacting active ingredients, more MCT oil may be present. For example, when an amount of active ingredient(s) is 15 percent by weight or more of an active ingredient that has a tendency to interact with structurant such as vitamin C or choline, an amount of MCT oil will be less than 12 percent by weight, such as less than 10 percent by weight or a ratio of MCT oil to active ingredient(s) of less than 1. When a gummy or gum composition contains active ingredients that are non-structurant-interacting active ingredient(s) only, an amount of MCT oil can be 15 percent by weight or more, such as 17 percent by weight, such as 20 percent by weight, or such as 22 percent by weight.

Other constituents that may be present include but are not limited to a buffer or buffers to manage a pH of the gummy or gum composition, a flavorant or flavorants to manage a desired taste, and a colorant to manage a color of the gummy or gum composition.

An amount of a water-soluble active ingredient may vary in a gummy or gum composition. It has been found that an amount of a water-soluble vitamin, vitamin C, can be present in an amount of 8 percent by weight to 20 percent by weight, such as 10 percent by weight to 20 percent by weight, such as 12 percent by weight to 18 percent by weight, and such as 15 percent by weight to 18 percent by weight, while maintaining the structural or physical properties discussed above as well as acceptable taste properties. This compares to commercially available gummy or gum compositions of similar size that have less than 10 percent vitamin C by weight. The vitamin C present in a gummy or gum composition may be in the form of an acid, ascorbic acid, and/or a salt (e.g., an ascorbate salt such as sodium ascorbate). In one example, combinations of an acid and salt may be used. For example, it has been found that combining amounts of ascorbic acid with a salt of sodium ascorbate at a ratio of sodium ascorbate to ascorbic acid of less than 0.4, such as less than 0.3, such as 0.2, such as 0.05 to 0.15, and such as 0 to 0.05 to provides a gummy or gum composition having an acceptable pH (a pH of 2.9 to pH of 4.5). Increasing an amount of the salt beyond the noted ratio tends to produce a gummy or gum composition that is too soft and has a salty taste. Decreasing the amount of the salt tends to produce a gummy or gum composition that is too acidic (e.g., a pH less than 2.9). As the salt (e.g., sodium ascorbate) has a property to adjust (raise) a pH of a gummy or gum composition, where an acid (e.g., ascorbic acid) is used alone, the gummy or gum composition may include a constituent other than a vitamin C salt to adjust (raise) the pH (e.g., trisodium citrate).

Where the water-soluble active ingredient is a nutrient such as choline, the nutrient can be present in an amount of 8 percent by weight to 20 percent by weight, such as 10 percent by weight to 20 percent by weight, such as 12 percent by weight to 18 percent by weight, and such as 15 percent by weight to 18 percent by weight, while maintaining the structural or physical properties discussed above as well as acceptable taste properties. A source of choline includes a salt or combinations of salts of choline such as choline bitartrate or choline chloride. Choline bitartrate tends to be more sour than choline chloride. Therefore, a combination of choline salts may be utilized to balance the taste and possibly the effect on the hardness.

Where the water-soluble active ingredient is a plant extract(s) or herb(s) (e.g., herb extract(s)), the plant extract(s) or herb(s) or their combination may be present in an amount of 4 percent by weight to 15 percent by weight, such as 5 percent by weight to 12 percent by weight, and such as 6 percent by weight to 8 percent by weight, while maintaining the structural or physical properties discussed above as well as acceptable taste properties.

In one example, the water-soluble active ingredient is present as a single active ingredient (e.g., vitamin C, choline, mango leaf extract) in a gummy or gum composition where the single active ingredient may be in the form of a single source (e.g., a single source of vitamin C such as ascorbic acid) or a combination of sources (e.g., a single active ingredient of vitamin C provided by a combination of ascorbic acid and sodium ascorbate). In another example, the water-soluble active ingredient may be combined with one or more other active ingredients where the one or more other active ingredients may or may not be water-soluble active ingredients. Examples of combinations of water-soluble active ingredients include vitamin C and choline or vitamin C and chamomile, or mango leaf extract and ashwagandha. Examples of combinations of a water-soluble active ingredient and a non-water soluble active ingredient include vitamin C with non-water soluble active ingredients of vitamin D or zinc or vitamin D and zinc.

To form a gummy or gum composition, the water phase and oil phase are separately prepared. For the water phase, the structurant(s) may initially be combined with a portion of the sugar (e.g., 50 percent or more of the sugar). Deionized water and corn syrup(s) may be combined and heated, such as to about 55° C. to 70° C. The structurant(s)/sugar may then be hydrated in an appropriate mixer, such as a Caframo overhead mixer, with the water and corn syrup mixture and any remaining portion of sugar added at about 85° C. to 95° C. for 15 minutes. Hydration is followed by the addition of other constituents (e.g., sweetener(s), buffer, flavor). Other constituents of the water phase may then be added to the hydrated structurant(s) followed by heating of the mixture to about 85° C. to 100° C. to dissolve the sugar completely. The oil phase may be separately prepared by adding the water-soluble active ingredient(s) to the MCT oil as well as any lecithin. Following preparation of the water phase, the oil phase is then mixed with the water phase at a mixing speed sufficient to form an emulsification of micrometer or less size droplets of the oil phase uniformly dispersed throughout the water phase. A representative example is mixing the water phase and oil phase using a Silverson L5M-A mixer at a mixing speed of about 5000 rpm to 8000 rpm. Without wishing to be bound by theory, it is believed the water-soluble active ingredient(s) move from the oil phase to the water phase during emulsifying and are dissolved in the water phase. After emulsifying, the mixture is poured into molds of a desired shape and size for an edible gummy composition and allowed to at least begin to set. The molds may be silicone or starch molds or other form. A gummy or gum composition may be removed from the mold after a reasonable removal time, such as 60 minutes or less and allowed to set. A "removal time," "removable time" or "release time" is a time that it takes for at least an outer portion of a gummy composition to gel so that the gummy composition may be removed from a mold as a single unit. A "set time" is a time it takes for a gummy composition to form a firm gelled structure throughout—from an outer surface to a midpoint when measured on each side or face. By selecting the appropriate amount of constituents and active ingredient(s) in the gummy or gum composition and making it as described, a gummy or gum composition will have a hardness of 115 gForce or greater, such as 115 gForce to 500 gForce, measured as a peak force using a TA-8A probe to push through a gummy or gum composition sample from a top surface for 5 millimeters (mm) at a speed of 0.5 millimeters per second (mm/sec.), the gummy or gum composition sample having a square shape of 2.0 centimeters (cm) by 2.0 cm with thickness of 0.9 cm; a water activity of 0.73 or less such as 0.70 or less; a ° Brix of 76 to 83, such as 78 to 81; and a pH of 2.9 to 4.5, such as a pH of 3.3 to 3.8.

Vitamin C Gummy or Gum Compositions

As described above, a gummy or gum composition can have an amount of a water-soluble active ingredient that is a water-soluble vitamin, vitamin C, present in an amount of 8 percent by weight to 20 percent by weight. Table 1 presents a target formulation for a gummy or gum composition including vitamin C present in an amount of 18.5 percent by weight and using a combination of gelatin and pectin structurants. The vitamin C source is a combination of vitamin C salt (e.g., sodium ascorbate) and ascorbic acid at a ratio of less than 0.4, in this example target formulation 0.09.

TABLE 1

| Ingredients (Supplier) | Wt % range | Example Wt % |
|---|---|---|
| Water | 9.5-17.5 | 11.01% |
| HM Pectin CS509 (Herbstreith & Fox) | 1.3-2.5 | 2.04% |
| Gelatin 250 Bloom (Gelita) | 3.3-5.0 | 3.53% |
| 43DE Corn Syrup (Cargill) | 29.5-42.5 | 18.33% |
| 63DE Corn Syrup (Cargill) | | 20.45% |
| Sugar (Prinova USA) | 15.0-27.5 | 15.86% |
| Glycerin (Behn Meyer) | 0.5-4.0 | 3.00% |
| MCT Oil (Stepan) | 5.0-10.0 | 6.77% |
| Lecithin (American Lecithan Co.) | 0.05-0.2 | 0.09% |
| Ascorbic Acid (Prinova USA) | | 16.96% |
| Sodium ascorbate (Prinova USA) | | 1.54% |
| Color (Oterra) | 0-1.2 | 0.05% |
| Flavor | 0.05-0.50 | 0.33% |
| Sucralose (Tate & Lyle) | 0.00-0.05 | 0.03% |
| | | 100.00% |

Target physical property parameters for the gummy or gum composition described in Table 1 are a ° Brix of 76 to 83, such as 78 to 81; a water activity of less than 0.73, such as less than 0.70, a pH of 2.9 to 4.5, such as a pH of 3.4 to 4; a hardness of 115 gForce to 500 gForce, such as 130 gForce to 500 gForce, measured as a peak force using a TA-8A probe to push through a gummy or gum composition sample from a top surface for 5 millimeters (mm) at a speed of 0.5 millimeters per second (mm/sec.), the gummy or gum composition sample having a square shape of 2.0 centimeters (cm) by 2.0 cm with thickness of 0.9 cm; and a hardness using a TA-25 cylindrical probe of 130 gForce to 1500 gForce, such as 200 gForce to 1300 gForce. A hardness test using a TA-25 cylindrical probe (diameter 2 inches and height 20 mm) was conducted by compressing from a surface of a sample with the probe at 0.5 mm per second to a distance of 80 percent of an original height of the sample, then returning to the original position at the same speed, followed by a one second resting then repeating the compressing and returning with the same conditions.

The gummy or gum composition formed according to the target formulation presented in Table 1 will have consumer-acceptable firmness and chewiness for a gummy or gum composition.

Table 2 presents a target formulation for a gummy or gum composition including vitamin C present in an amount of 17.5 percent by weight and using a combination of gelatin and agar-agar structurants. The vitamin C source is a combination of ascorbic acid and sodium ascorbate and a ratio of less than 0.4, in this example target formulation 0.33.

TABLE 2

| Ingredients (Supplier) | Wt % range | Example Wt % |
|---|---|---|
| Water | 16.0-23.0 | 13.29% |
| Agar-agar (Ingredion/TIC Pretested ®Agar Agar 100 powder)) | 1.3-2.0 | 1.68% |
| Gelatin 250 Bloom (Gelita) | 3.0-4.0 | 3.15% |
| Maltitol syrup (Cargill) | 21.0-28.5 | 28.01% |
| Sugar (Prinova USA) | 15.0-27.0 | 16.81% |
| Fructose (Tate & Lyle) | | 8.40% |
| Glycerin (Behn Meyer) | 0.5-4.0 | 1.00% |
| MCT Oil (Stepan) | 7.0-11.5 | 7.99% |
| Lecithin (American Lecithan Co.) | 0.05-0.2 | 0.10% |
| Ascorbic Acid (Prinova USA) | | 13.10% |
| Sodium ascorbate (Prinova USA) | | 4.37% |
| Color (Oterra) | 0-1.2 | 0.28% |
| Flavor | 0.05-0.50 | 1.75% |
| Sucralose (Tate & Lyle) | 0.00-0.05 | 0.07% |
| | | 100.00% |

Target physical property parameters for the gummy or gum composition described in Table 2 are a ° Brix of 76 to 83, such as 78 to 81; a water activity of less than 0.73, such as less than 0.70, a pH of 2.9 to 4.5, such as a pH of 3.3 to 4; a hardness of 115 gForce to 500 gForce, such as 130 to 500, measured as a peak force using a TA-8A probe to push through a gummy or gum composition sample from a top surface for 5 millimeters (mm) at a speed of 0.5 millimeters per second (mm/sec.), the gummy or gum composition sample having a square shape of 2.0 centimeters (cm) by 2.0 cm with thickness of 0.9 cm; and a hardness using a TA-25 cylindrical probe of 130 gForce to 1500 gForce, such as 200 gForce to 1300 gForce.

The gummy or gum composition formed according to the target formulation presented in Table 2 will have consumer-acceptable firmness and chewiness for a gummy or gum composition.

Tables 3-8 present gummy or gum compositions having an active ingredient of vitamin C present in an amount of 8 percent by weight to 20 percent by weight. Unless otherwise indicated, the gummy or gum compositions were prepared using ingredients or constituents from the same supplier source as the ingredients or constituents of the target formulations in Table 1 and Table 2. Also, where an ingredient or constituent is introduced in Tables 3-8 for the first time and then used again in a subsequently described gummy or gum composition, unless otherwise indicated, the subsequently described gummy or gum composition(s) were prepared using that ingredient or constituent from the same supplier source.

TABLE 3

Vitamin C emulsion gummy with Agar-agar and Gelatin as structurant
(Vit C wt %: 17.3-17.5)

| | Lot Number | | | | | |
|---|---|---|---|---|---|---|
| | #1 | #2 | #3 | #4 | #5 | #6 |
| Ingredients | | | | | | |
| | Wt % | Wt % | Wt % | Wt % | Wt % | Wt % |
| Water | 17.35% | 16.78% | 18.99% | 18.14% | 12.43% | 13.50% |
| Agar-agar | 1.68% | 1.71% | 1.24% | 1.62% | 1.72% | 1.66% |
| Gelatin 250 Bloom | 3.38% | 2.82% | 4.05% | 4.16% | 3.24% | 3.13% |
| Maltitol syrup | 21.71% | 22.21% | 19.75% | 21.04% | 28.48% | 27.48% |
| Sugar | 20.47% | 20.94% | 18.63% | 19.83% | 25.63% | 24.73% |
| Xylitol(Danisco) | 6.20% | 6.35% | 5.64% | 6.01% | 0.00% | 0.00% |
| Glycerin | 0.00% | 0.00% | 0.00% | 0.00% | 1.00% | 1.00% |
| Lecithin | 0.08% | 0.08% | 0.00% | 0.08% | 0.10% | 0.10% |
| MCT Oil | 11.52% | 11.52% | 14.18% | 11.52% | 9.73% | 9.73% |
| Sodium Ascorbate | 4.35% | 4.35% | 4.33% | 4.35% | 4.37% | 4.37% |
| Ascorbic Acid | 13.05% | 13.05% | 12.99% | 13.05% | 13.10% | 13.10% |
| Trisodium Citrate (Cargill) | 0.20% | 0.20% | 0.20% | 0.20% | 0.20% | 1.20% |
| Total | 100.0% | 100.0% | 100.0% | 100.0% | 100.00% | 100.00% |
| Final pH (1:1 Ratio) | 4.01 | 3.89 | 3.76 | 3.74 | 3.64 | 3.99 |
| Brix (%) | 81.0 | 82.0 | 79.3 | 80.5 | 81.3 | 78.8 |
| Water Activity | 0.6126 | 0.5833 | 0.6763 | 0.6053 | 0.6303 | 0.6591 |
| TA-8A Hardness (g * Force) | 208 | 95.6 | 103.7 | 119.4 | 158.6 | 348.7 |
| TA-25 Hardness (g * Force) | 369.8 | 147.4 | 336.9 | 341.6 | 287.5 | 746.7 |

In the example lots presented in Table 3, an amount of vitamin C, by a combination of ascorbic acid and sodium ascorbate, is 17.3 percent by weight to 17.5 percent by weight. The gummy or gum composition were made with a combination of gelatin and agar-agar structurants. Table 3 shows that Lot #1, Lot #4, Lot #5 and Lot #6 all had acceptable physical properties. Lot #2 combined 1.6 times the amount of gelatin to agar-agar which yielded a TA-8A hardness level below the acceptable 115 gForce. Lot #3 used a greater amount of MCT oil (14.18 percent by weight) which yielded a TA-8A hardness level below the acceptable 115 gForce.

TABLE 4

Vitamin C emulsion gummy with agar-agar and gelatin as structurants and a fructose reducing sugar

| Ingredients | #7 Wt % | #8 Wt % |
|---|---|---|
| Water | 13.29% | 13.29% |
| Agar-agar | 1.68% | 1.68% |
| Gelatin 250 Bloom | 3.15% | 3.15% |
| Maltitol syrup | 28.01% | 28.01% |
| Sugar | 16.81% | 12.61% |
| Fructose | 8.40% | 12.61% |
| Sucralose | 0.07% | 0.07% |
| Lemon Flavor (FONA) | 1.15% | 1.15% |
| Masking Agents (FONA) | 0.60% | 0.65% |
| Sucrose Ester (Sisterna) | 0.08% | 0.08% |
| Glycerin | 1.00% | 1.00% |
| MCT oil | 7.99% | 7.93% |
| Coconut Oil (Nutiva) | 0.00% | 0.00% |
| Lecithin | 0.10% | 0.10% |
| Sodium Ascorbate | 4.37% | 4.37% |
| Ascorbic Acid | 13.10% | 13.10% |
| Trisodium Citrate | 0.20% | 0.20% |
| Total | 100.0% | 100.0% |
| Final pH (1:1 Ratio) | 3.82 | 3.69 |
| Brix | 80 | 80 |
| Water Activity | 0.66 | 0.67 |
| TA-8A Hardness (g * Force) | 126.8 | 122.7 |
| TA-25 Hardness (g * Force) | 444.7 | 384.7 |

In the example lots presented in Table 4, an amount of vitamin C, by a combination of ascorbic acid and sodium ascorbate, is 17.3 percent by weight to 17.4 percent by weight. The gummy or gum composition were made with a combination of gelatin and agar-agar structurants at a ratio of gelatin to agar-agar of one to 0.53. The reducing sugar fructose was used as a sweetener in amounts of 8.40 percent by weight in Lot #7 and 12.61 percent by weight in Lot #8. Each of Lot #7 and Lot #8 produced gummy or gum compositions having acceptable physical properties.

TABLE 5

Vitamin C emulsion gummy with pectin and gelatin as structurants

| Ingredients | #9 Wt % | #10 Wt % | #11 Wt % | #12 Wt % |
|---|---|---|---|---|
| Water | 17.03% | 16.79% | 15.89% | 15.24% |
| HM Pectin CS509 | 1.44% | 1.44% | 1.82% | 1.75% |
| Gelatin 250 Bloom | 4.76% | 4.77% | 4.61% | 4.42% |
| Maltitol | 33.03% | 32.00% | 31.30% | 30.04% |
| Sugar | 26.83% | 26.00% | 25.43% | 24.40% |
| MCT Oil | 8.11% | 8.66% | 5.92% | 6.87% |
| Lecithin | 0.00% | 0.00% | 0.05% | 0.06% |
| Sodium Ascorbate | 1.35% | 1.60% | 2.09% | 2.43% |
| Ascorbic Acid | 7.44% | 8.74% | 11.84% | 13.74% |
| Mixed Berry Flavor (Virginia Dare) | 0.00% | 0.00% | 0.50% | 0.50% |
| Masking flavor QN 94 (Virginia Dare) | 0.00% | 0.00% | 0.40% | 0.40% |
| Purple Color (Oterra) | 0.00% | 0.00% | 0.15% | 0.15% |
| Total | 100.0% | 100.0% | 100.0% | 100.0% |
| Final pH (1:1 Ratio) | 3.71 | 3.71 | 3.45 | 3.42 |
| Brix (%) | 80 | 80 | 78.5 | 78.8 |
| Water Activity | 0.6643 | 0.6268 | 0.6433 | 0.6238 |
| TA-8A Hardness (g * Force) | 123 | 172.2 | 121.4 | 87.2 |
| TA-25 Hardness (g * Force) | 170.4 | 198.8 | 148.2 | 115.9 |

In the example lots presented in Table 5, an amount of vitamin C, by a combination of ascorbic acid and sodium ascorbate, is 8.8 percent by weight to 16.2 percent by weight. The gummy or gum composition were made with a combination of gelatin and pectin structurants at a ratio of gelatin to pectin of one to 0.3 (Lot #9, Lot #10) and one to 0.39 (Lot #11, Lot #12). Lot #12 showed a TA-8A hardness value of 87.2 gForce indicating that the smaller amount of gelatin present was likely insufficient to form a suitable gummy or gum composition.

TABLE 6

Vitamin C emulsion gummy with gelatin and pectin structurants and corn syrup as sweetener

| Ingredients | #13 Wt % | #14 Wt % |
|---|---|---|
| Water | 12.24% | 11.01% |
| HM Pectin CS509 | 2.00% | 2.04% |
| Gelatin 250 Bloom | 3.44% | 3.53% |
| 43DE Corn Syrup | 17.06% | 20.45% |
| 63DE Corn Syrup | 20.09% | 18.33% |
| Sugar | 16.40% | 15.86% |
| Glycerin | 3.00% | 3.00% |
| MCT Oil | 6.36% | 6.77% |
| Lecithin | 0.09% | 0.09% |
| Ascorbic Acid | 18.50% | 16.96% |
| Sodium Ascorbate | 0.00% | 1.54% |
| Yellow Color (Oterra) | 0.05% | 0.05% |
| Grapefruit Flavor (Gold Coast) | 0.75% | 0.33% |
| Sucralose | 0.02% | 0.03% |
| Total | 100.0% | 100.0% |
| Final pH (1:1 Ratio) | 2.91 | 3.27 |
| Brix (%) | 81.8 | 81.5 |
| Water Activity | 0.6134 | 0.6380 |
| TA-8A Hardness (g * Force) | 332.8 | 171.9 |
| TA-25 Hardness (g * Force) | 621.6 | 161.1 |

In the example lots presented in Table 6, an amount of vitamin C, by ascorbic acid alone (Lot #13) or a combination of ascorbic acid and sodium ascorbate (Lot #14), is 18.5 percent by weight. In the example lots presented in Table 6, a sweetener of corn syrup is utilized (a combination of 43DE corn syrup and 63DE corn syrup). Each of Lot #13 and Lot #14 produced gummy or gum compositions having acceptable physical properties.

TABLE 7

Vitamin C emulsion gummy with pectin structurant

| Ingredients | #15 Wt % | #16 Wt % | #17 Wt % |
|---|---|---|---|
| Water | 16.58% | 16.40% | 15.21% |
| HM Pectin CS509 | 2.51% | 2.72% | 2.59% |
| Maltitol | 34.03% | 34.07% | 31.24% |
| Sugar | 29.88% | 29.92% | 27.43% |
| MCT Oil | 8.16% | 8.11% | 8.93% |
| Sodium Ascorbate | 2.21% | 1.35% | 2.12% |
| Ascorbic Acid | 6.63% | 7.44% | 11.75% |
| Grapefruit flavor | 0.00% | 0.00% | 0.71% |
| Sucralose | 0.00% | 0.00% | 0.03% |
| Total | 100.0% | 100.0% | 100.0% |
| Final pH (1:1 Ratio) | 3.52 | 3.55 | 3.48 |
| Brix (%) | 81.5 | 81 | 79.8 |
| Water Activity | 0.63 | 0.65 | 0.6529 |
| TA-8A Hardness (g * Force) | 160.9 | 265.4 | 134.4 |
| TA-25 Hardness (g * Force) | 138.1 | 212.4 | 161.4 |

In the example lots presented in Table 7, an amount of vitamin C, by a combination of ascorbic acid and sodium ascorbate is 8.5 percent by weight (Lot #15), 8.8 percent by weight (Lot #16) and 13.9 percent by weight (Lot #16). In the example lots presented in Table 7, a single structurant of pectin was utilized. Each of Lot #15, Lot #16 and Lot #17 produced gummy or gum compositions having acceptable physical properties.

TABLE 8

Vitamin C emulsion gummy with vitamin D and zinc citrate

| Ingredients | #18 Wt % | #19 Wt % | #20 Wt % | #21 Wt % |
|---|---|---|---|---|
| Water | 10.56% | 10.05% | 9.65% | 15.89% |
| HM Pectin CS509 | 2.00% | 1.89% | 2.15% | 1.82% |
| Gelatin 250 Bloom | 4.80% | 4.55% | 3.90% | 4.61% |
| 43DE Corn Syrup | 14.21% | 13.47% | 22.21% | 0.00% |
| 63DE Corn Syrup | 26.81% | 25.42% | 19.66% | 0.00% |
| Maltitol Syrup | 0.00% | 0.00% | 0.00% | 31.30% |
| Sugar | 19.21% | 18.21% | 16.02% | 25.43% |
| Sucralose | 0.03% | 0.03% | 0.03% | 0.00% |
| Masking agent QN94 | 0.43% | 0.43% | 0.43% | 0.40% |
| Tangerine flavor (American Fruits and Flavor) | 0.70% | 0.70% | 0.70% | 0.00% |
| Orange color (Oterra) | 0.06% | 0.06% | 0.06% | 0.00% |
| Mixed berry flavor | 0.00% | 0.00% | 0.00% | 0.50% |
| Purple color | 0.00% | 0.00% | 0.00% | 0.15% |
| Sodium ascorbate | 1.72% | 1.72% | 0.00% | 1.79% |
| Ascorbic Acid | 10.78% | 10.78% | 17.64% | 11.34% |
| Trisodium Citrate | 0.00% | 0.00% | 0.21% | 0.00% |
| Zinc Citrate (Jungbunzlauer) | 0.11% | 0.11% | 0.16% | 0.11% |
| Vitamin D-3 (BASF) | 0.75% | 0.75% | 1.08% | 0.75% |
| MCT Oil | 7.76% | 11.76% | 6.01% | 5.86% |
| Lecithin | 0.07% | 0.07% | 0.10% | 0.05% |
| Total | 100.0% | 100.0% | 100.0% | 100.0% |
| Final pH (1:1 Ratio) | 3.56 | 3.59 | 3.06 | 3.71 |
| Brix (%) | 77.8 | 78.3 | 80.8 | 80.3 |
| Water Activity | 0.6998 | 0.6857 | 0.6234 | 0.6807 |
| TA-8A Hardness (g * Force) | 122.2 | 53.6 | 352.1 | 132.6 |
| TA-25 Hardness (g * Force) | 218.1 | 67.2 | 886.1 | 260.8 |

In the example lots presented in Table 8, an amount of vitamin C, by a combination of ascorbic acid and sodium ascorbate is 12.5 percent by weight (Lot #18, Lot #19), 17.6 percent (Lot #20) and 13.1 percent by weight (Lot #21). In the example lots presented in Table 8, a combination of structurants of gelatin and pectin were utilized. Each of example Lots #19-#22 included additional active ingredients of zinc (in the form of the citrate salt) and vitamin D3. Each of Lot #18, Lot #20 and Lot #21 produced gummy or gum compositions having acceptable physical properties. The TA-8A hardness of gummy or gum composition of Lot #19 was too low. This could be attributed to a higher level of MCT oil in Lot #19.

Choline Gummy or Gum Compositions

As described above, a gummy or gum composition can have an amount of a water-soluble active ingredient that is a water-soluble nutrient, choline, present in an amount of 8 percent by weight to 20 percent by weight. Table 9 presents formulations of a gummy or gum composition including choline. Similar to Tables 3-8, unless otherwise indicated, the gummy or gum compositions in Table 9 were prepared using constituents from the same supplier source as the constituents of the formulations in Table 1 and Table 2.

TABLE 9

Choline emulsion gummy with gelatin or gelatin and pectin structurants

| Ingredients | #23 Wt % | #24 Wt % | #25 Wt % | #26 Wt % |
|---|---|---|---|---|
| Water | 9.53% | 9.37% | 9.30% | 11.77% |
| HM Pectin CS509 | 2.08% | 0.00% | 0.00% | 2.02% |
| Gelatin 250 Bloom | 3.76% | 6.32% | 6.27% | 3.79% |
| 43DE Corn Syrup | 21.46% | 12.85% | 12.75% | 22.45% |
| 63DE Corn Syrup | 18.99% | 25.06% | 24.87% | 19.87% |
| Sugar | 15.48% | 17.55% | 17.41% | 16.56% |
| color | 0.06% | 0.06% | 0.06% | 0.06% |
| Choline bitartrate ultra-fine Powder (Balchem) | 17.16% | 17.12% | 11.25% | 8.83% |
| Choline chloride (Balchem) | 0.00% | 0.00% | 2.80% | 4.48% |
| MCT Oil | 9.85% | 9.82% | 13.87% | 8.78% |
| Lecithin | 0.08% | 0.08% | 0.08% | 0.05% |
| Tangerine flavor | 0.80% | 0.80% | 0.80% | 0.80% |
| Masking flavor QN94 | 0.30% | 0.50% | 0.50% | 0.50% |
| sucralose | 0.05% | 0.05% | 0.05% | 0.05% |
| Trisodium Citrate | 0.41% | 0.41% | 0.00% | 0.00% |
| Total | 100.0% | 100.0% | 100.0% | 100.00% |
| Final pH (1:1 Ratio) at 30 C. | 3.800 | 3.82 | 3.71 | 3.69 |
| Brix (%) | 76.3 | 80.5 | 76.5 | 77.3 |
| Water Activity | 0.6056 | 0.6329 | 0.6175 | 0.6109 |
| TA-8A Hardness (g * Force) | 275.9 | 71.3 | 81.5 | 158.5 |
| TA-25 Hardness (g * Force) | 421.4 | 154.7 | 150.7 | 247.9 |

In the example lots presented in Table 9, an amount of choline is 17.16 percent by weight (Lot #23), 17.12 percent by weight (Lot #24), 14 percent (Lot #25) and 13.3 percent by weight (Lot #26). In Lot #25 and Lot #26, the choline present is a combination of two salts, choline bitartrate and choline chloride. Each of Lot #23 and Lot #26 produced gummy or gum compositions having acceptable physical properties. The TA-8A hardness of gummy or gum compositions of Lot #24 and Lot #25 were too low. This could be attributed to the use of a single structurant of gelatin in these gummy or gum compositions. Lot #23 and Lot #26 used a combination of gelatin and pectin structurants.

Mango Leaf Extract Gummy or Gum Composition

As described above, a gummy or gum composition can have an amount of a water-soluble active ingredient that is a water-soluble nutrient, mango leaf extract, present in an amount of 4 percent by weight to 15 percent by weight. Table 10 presents formulations of a gummy or gum composition including mango leaf extract sold under the name Zynamite®, Nektium Pharma S. L., and commercially available from PLT Health Solutions of Morristown, New Jersey. Unless otherwise indicated, the gummy or gum compositions in Table 10 were prepared using constituents from the same supplier source as the constituents of the formulations in Table 1 and Table 2.

TABLE 10

Gummy or Gum Compositions with Mango Leaf Extract and Gelatin and Agar-Agar Structurants

| | Lot Number | |
|---|---|---|
| Ingredients | #27 Wt % | #28 Wt % |
| Water | 12.42% | 10.769% |
| Agar-agar | 1.02% | 0.870% |
| Gelatin 250 Bloom | 4.36% | 3.724% |
| 43DE Corn Syrup | 11.10% | 9.478% |
| 63DE Corn Syrup | 23.00% | 19.633% |
| Sugar | 28.55% | 24.372% |
| Orange Color | 0.06% | 0.060% |
| Mango Leaf Extract Powder (PLT Health Solutions) | 4.16% | 8.250% |
| MCT Oil | 14.25% | 21.600% |
| Lecithin | 0.09% | 0.150% |
| Mango Flavor (Gold Coast) | 0.65% | 0.750% |
| sucralose | 0.05% | 0.045% |
| Citric Acid (Jungbunzlauer) | 0.30% | 0.300% |
| Total | 100.00% | 100.00% |
| Final pH (1:1 Ratio) | 4.06 | 4.27 |
| Brix (%) | 77.3 | 80.5 |
| Water Activity | 0.713 | 0.6794 |
| TA-8A Hardness (g * Force) | 453.7 | 278.2 |
| TA-25 Hardness (g * Force) | 1342.4 | 1009.9 |

In the example lots presented in Table 10, an amount of mango leaf extract is 4.16 percent by weight (Lot #27) and 8.25 percent by weight (Lot #28). Each of Lot #27 and Lot #28 produced gummy or gum compositions having acceptable physical properties.

Chamomile Gummy or Gum Composition

As described above, a gummy or gum composition can have an amount of a water-soluble active ingredient that is a water-soluble nutrient, chamomile, present in an amount of 4 percent by weight to 15 percent by weight. Table 11 presents a formulation of a gummy or gum composition including chamomile, *Matricaria Recutita*. Unless otherwise indicated, the gummy or gum composition in Table 11 was prepared using constituents from the same supplier source as the constituents of the formulations in Table 1 and Table 2.

TABLE 11

Gummy or Gum Composition with Chamomile and Gelatin Structurant

| Ingredients | Lot Number #29 Wt % |
|---|---|
| Water | 10.39% |
| Gelatin 250 Bloom | 5.92% |
| Sugar | 21.54% |
| 43DE corn syrup | 14.81% |
| 63DE corn syrup | 14.81% |
| Chamomile extract (NURA) | 13.67% |
| MCT Oil | 17.21% |
| Lecithin | 0.12% |

TABLE 11-continued

Gummy or Gum Composition with Chamomile and Gelatin Structurant

| Ingredients | Lot Number #29 Wt % |
|---|---|
| Passion Fruit Orange flavor (Gold Coast) | 0.70% |
| Masking flavor (Gold Coast) | 0.30% |
| Orange color | 0.30% |
| Citric acid | 0.24% |
| Total | 100.00% |
| Final pH (1:1 Ratio) | 4.19 |
| Brix (%) | 82.0 |
| Water Activity | 0.6508 |
| TA-8A Hardness (g * Force) | 189.2 |
| TA-25 Hardness (g * Force) | 525.7 |

As described above, a gummy or gum composition can have an amount of a water-soluble active ingredient that is a water-soluble nutrient, ashwagandha, present in an amount of 4 percent by weight to 15 percent by weight. Table 12 presents a formulation of a gummy or gum composition including ashwagandha root extract, Withania Somnifera, such as KSM-66 Ashwagandha®, IXOREAL Biomed Inc., commercially available from Shri Karlikeya Pharma of Hyderabad, India. Unless otherwise indicated, the gummy or gum composition in Table 12 was prepared using constituents from the same supplier source as the constituents of the formulations in Table 1 and Table 2.

TABLE 12

Gummy or Gum Composition with Ashwagandha and Gelatin and Agar-Agar Structurants

| Ingredients | Lot Number #30 Wt % |
|---|---|
| Water | 10.00% |
| Agar-agar | 0.88% |
| Gelatin 250 Bloom | 3.65% |
| Sugar | 24.77% |
| 43DE corn syrup | 9.63% |
| 63DE corn syrup | 19.95% |
| KSM-66 Ashwagandha ® (Shri Karlikeya Pharma) | 9.30% |
| MCT Oil | 21.70% |
| Citric acid | 0.12% |
| Total | 100.00% |
| Final pH (1:1 Ratio) | 3.90 |
| Brix (%) | 81.0 |
| Water Activity | 0.6264 |
| TA-8A Hardness (g * Force) | 304.8 |
| TA-25 Hardness (g * Force) | 754.6 |

The foregoing description presented gummy or gum compositions can meet acceptable physical property parameters to produce a product that has good texture, good heat stability and a pleasant taste. The gummy or gum composition may be packaged in a container with other similar gummy or gum compositions. The container may contain a label indicating the contents and suggested use. The gummy or gum composition may be administered by an individual (e.g., a human) consumer or aid to the individual by placing the gummy or gum composition in the mouth, chewing and then swallowing the gummy or gum composition. The administration may be as a supplement to nutrients, vitamins, minerals etc. consumed with a meal.

Aspects of the Invention

The following are aspects of the invention.

1. A gummy composition comprising a set emulsification of an oil phase and a water phase, and a water-soluble active ingredient.

2. The gummy composition of Aspect 1, wherein the gummy composition comprises a water activity below 0.73 and a hardness of 115 gForce to 500 gForce using a TA-8A probe to push through a gummy or gum composition sample from a top surface for 5 millimeters (mm) at a speed of 0.5 millimeters per second (mm/sec.), the gummy or gum composition sample having a square shape of 2.0 centimeters (cm) by 2.0 cm with thickness of 0.9 cm.

3. The gummy composition of Aspect 1 or Aspect 2, wherein the water-soluble active ingredient is vitamin C.

4. The gummy composition of Aspect 3, wherein the vitamin C is present in an amount of 10 percent by weight or greater.

5. The gummy composition of Aspect 3, wherein the vitamin C comprises a combination of ascorbic acid and a salt thereof.

6. The gummy composition of any of Aspects 1-5, wherein the oil phase comprises a medium chain triglyceride (MCT) oil.

7. The gummy composition of any of Aspects 1-6, wherein the composition further comprises lecithin.

8. The gummy composition of any of Aspects 1-7, wherein the water phase comprises a structurant of pectin. 9. The gummy composition of any of Aspects 1-7, wherein the water phase comprises a combination of at least two structurants.

10. The gummy composition of Aspect 9, wherein the combination of at least two structurants comprise pectin and gelatin.

11. The gummy composition of Aspect 9, wherein the combination of at least two structurants comprises gelatin and agar-agar.

12. The gummy composition of any of Aspects 1-11, wherein the water-soluble active ingredient comprises at least one of a nutrient and a plant or herb extract.

13. The gummy composition of any of Aspects 1-11, wherein the water-soluble active ingredient comprises at least one of a nutrient comprising choline.

14. The gummy composition of Aspect 13, wherein the choline comprises an amount of 8 percent by weight to 20 percent by weight.

15. The gummy composition of any of Aspects 1-12, wherein the water-soluble active ingredient comprises at least one of a plant extract or herb extract comprising an amount of 4 percent by weight to 15 percent by weight.

16. The gummy composition of any of Aspects 1-12, wherein the water-soluble active ingredient comprises at least one of a herb extract comprising chamomile.

17. The gummy composition of any of Aspects 1-12, wherein the water-soluble active ingredient comprises at least one of a herb extract comprising ashwagandha.

18. The gummy composition of any of Aspects 1-12, wherein the water-soluble active ingredient comprises at least one of a plant extract comprising mango leaf.

19. A method comprising:
administering a gummy composition according to any of Aspects 1-18.

20. The method of Aspect 19, wherein the water-soluble active ingredient comprises a vitamin.

21. The method of Aspect 19 or Aspect 20, wherein the vitamin comprises vitamin C present in an amount of 10 percent by weight or greater.

22. The method of any of Aspects 19-21, wherein the water-soluble active ingredient comprises a nutrient.

23. The method of Aspect 22, wherein the nutrient comprises choline comprising an amount of 8 percent by weight to 20 percent by weight.

24. The method of any of Aspects 19-23, wherein the water-soluble active ingredient comprises a plant or herb extract.

25. The method of any of Aspects 19-24, wherein the water-soluble active ingredient comprises mango leaf extract comprising an amount of 4 percent by weight to 15 percent by weight.

26. The method of any of Aspects 19-25, wherein the water-soluble active ingredient comprises chamomile comprising an amount of 4 percent by weight to 15 percent by weight.

27. The method of any of Aspects 19-26, wherein the water-soluble active ingredient comprises ashwagandha comprising an amount of 4 percent by weight to 15 percent by weight.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims and aspects appended and any and all equivalents thereof.

What is claimed is:

1. A gummy composition comprising a set emulsification of an oil phase and a water phase comprising at least one structurant contained in the water phase, and a water-soluble active ingredient.

2. The gummy composition of claim 1, wherein the gummy composition comprises a water activity below 0.73 and a hardness of 115 gForce to 500 gForce using a TA-8A probe to push through a gummy composition sample from a top surface for 5 millimeters (mm) at a speed of 0.5 millimeters per second (mm/sec.), the gummy composition having a square shape of 2.0 centimeters (cm) by 2.0 cm with thickness of 0.9 cm.

3. The gummy composition of claim 1, wherein the water-soluble active ingredient is vitamin C.

4. The gummy composition of claim 3, wherein the vitamin C is present in an amount of 10 percent by weight or greater.

5. The gummy composition of claim 3, wherein the vitamin C comprises a combination of ascorbic acid and a salt thereof.

6. The gummy composition of claim 1, wherein the oil phase comprises a medium chain triglyceride (MCT) oil.

7. The gummy composition of claim 1, wherein the composition further comprises lecithin.

8. The gummy composition of claim 1, wherein the water phase comprises a structurant of pectin.

9. The gummy composition of claim 1, wherein the water phase comprises a combination of at least two structurants.

10. The gummy composition of claim 9, wherein the combination of at least two structurants comprise pectin and gelatin.

11. The gummy composition of claim 9, wherein the combination of at least two structurants comprises gelatin and agar-agar.

12. The gummy composition of claim 1, wherein the water-soluble active ingredient comprises at least one of a nutrient and a plant or herb extract.

13. The gummy composition of claim 1, wherein the water-soluble active ingredient comprises at least one of a nutrient comprising choline.

14. The gummy composition of claim 13, wherein the choline comprises an amount of 8 percent by weight to 20 percent by weight.

15. The gummy composition of claim 1, wherein the water-soluble active ingredient comprises at least one of a plant extract or herb extract comprising an amount of 4 percent by weight to 15 percent by weight.

16. The gummy composition of claim 1, wherein the water-soluble active ingredient comprises at least one of a herb extract comprising chamomile.

17. The gummy composition of claim 1, wherein the water-soluble active ingredient comprises at least one of a herb extract comprising ashwagandha.

18. The gummy composition of claim 1, wherein the water-soluble active ingredient comprises at least one of a plant extract comprising mango leaf.

\* \* \* \* \*